United States Patent

[11] 3,540,567

| [72] | Inventor | Harold A. Keller |
| | | Lewiston, Idaho |
| [21] | Appl. No. | 762,511 |
| [22] | Filed | Sept. 25, 1968 |
| [45] | Patented | Nov. 17, 1970 |
| [73] | Assignee | Potlatch Forests, Inc. |
| | | Lewiston, Idaho |
| | | a corporation of Delaware |

[54] BIASING AND INDEXING APPARATUS FOR SHEET CONVEYOR ASSEMBLY
7 Claims, 6 Drawing Figs.

[52] U.S. Cl. .................................................. 198/29, 198/183, 198/197
[51] Int. Cl. ..................................................... B65g 47/22, B65g 47/52
[50] Field of Search............................................. 198/29, 35, 161, 167, 173, 183, 198, 218, 221; 214/6K; 271/45, 46, 75

[56] References Cited
UNITED STATES PATENTS
3,343,689  9/1967  Fehely........................ 214/6K Primary Examiner—Robert G. Sheridan
Attorney—Wells & St. John ABSTRACT: An indexing and conveying apparatus is described for successively moving a plurality of plywood sheets over a moving conveyor and sequentially dropping the sheets onto the conveyor in front of evenly spaced pusher elements. Pressing rollers are mounted on the conveyor ahead of the pusher elements for engaging the underside of the sheets. The rollers are rotated by a drive means in a direction to bias the sheets firmly against the pusher elements to prevent longitudinal misalignment of the sheets.

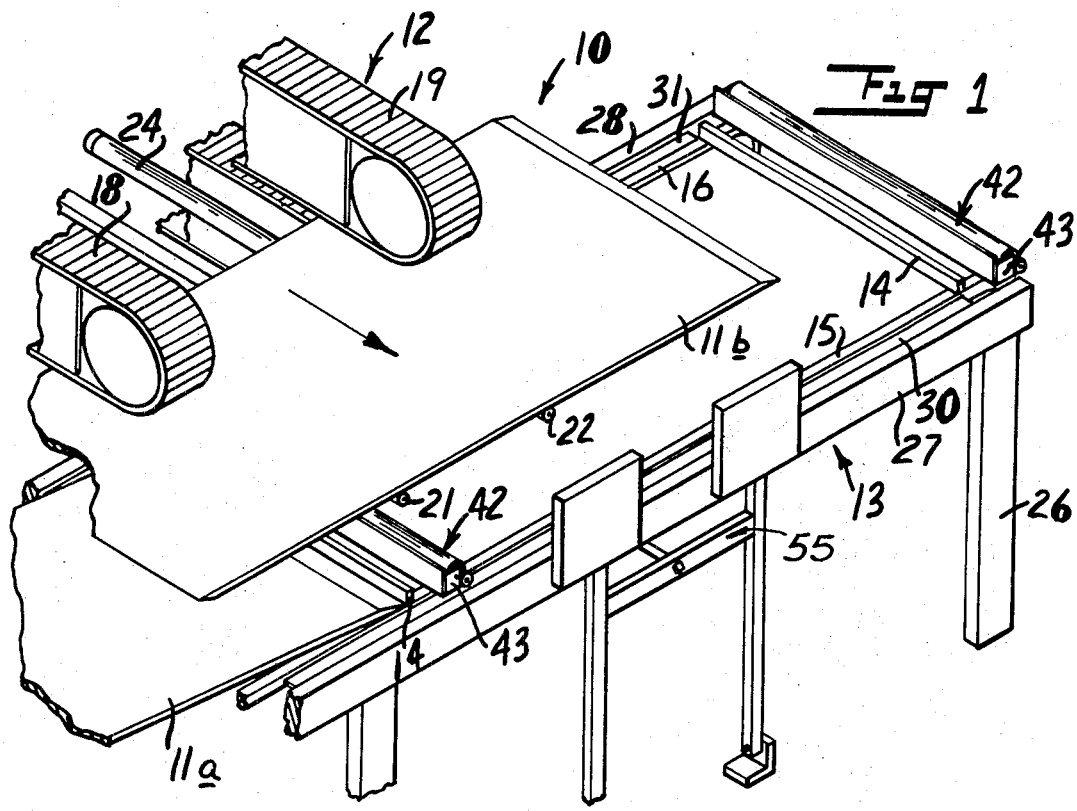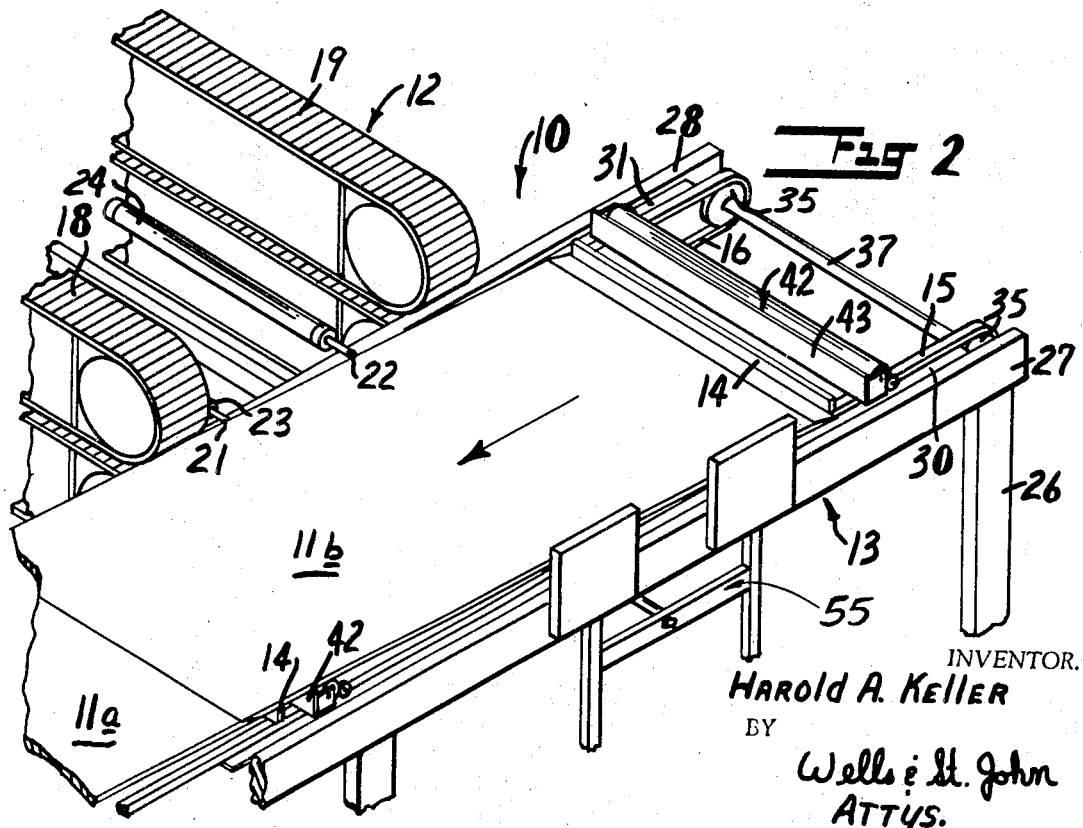

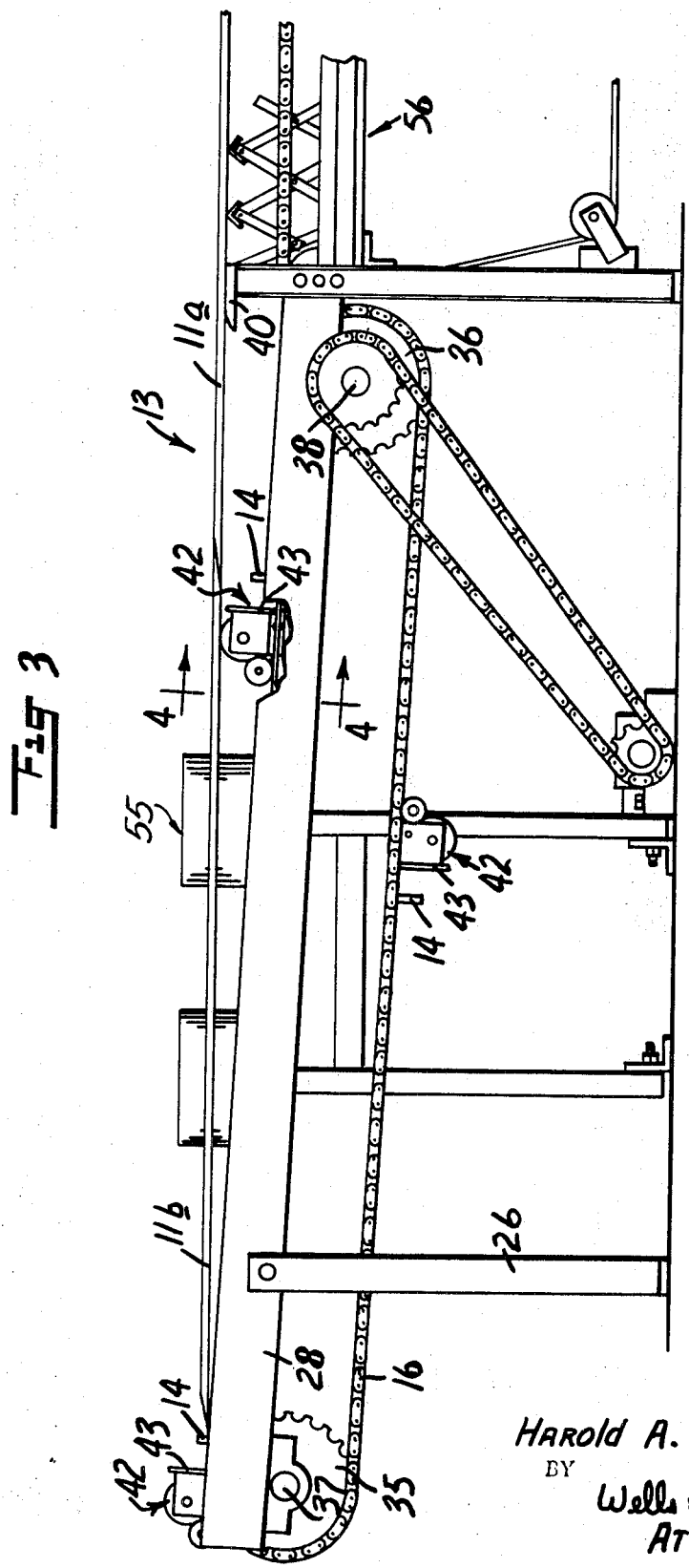

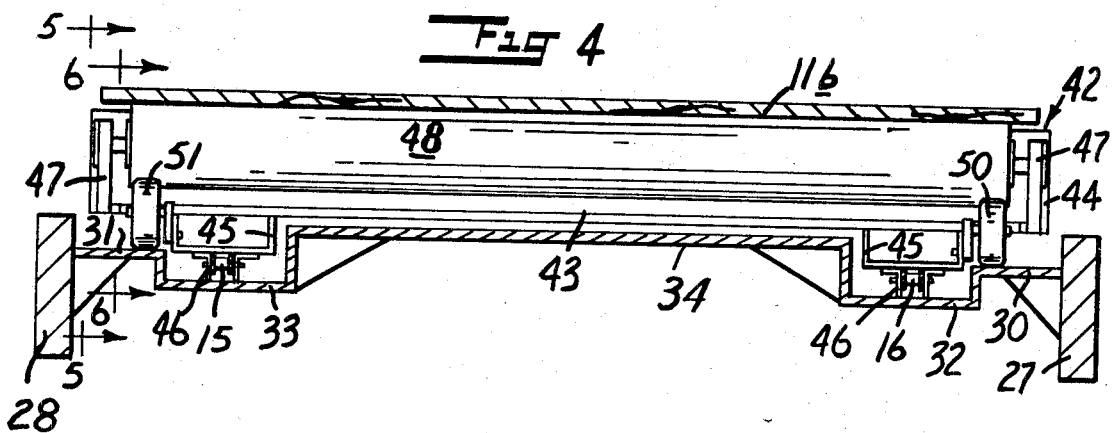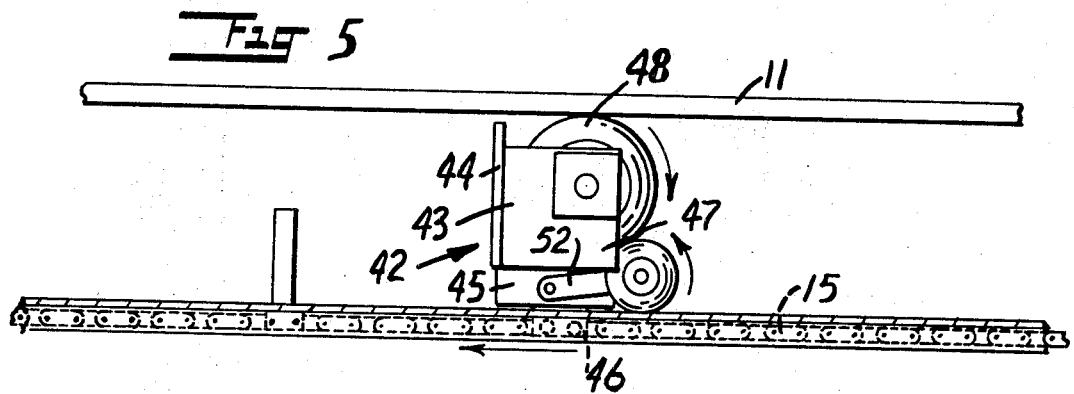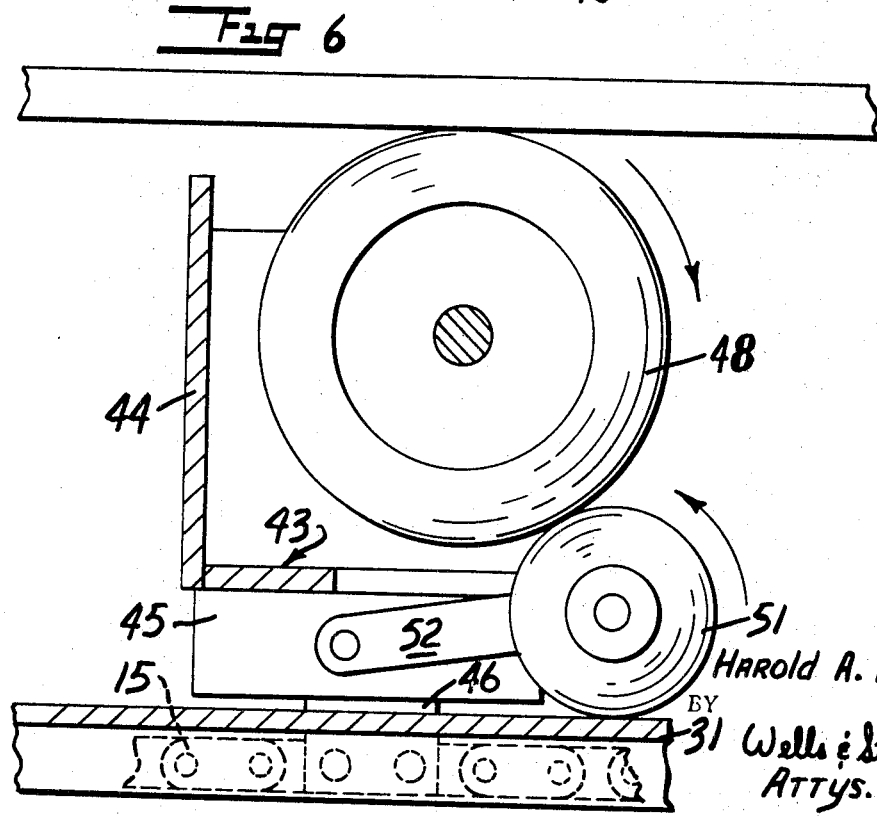
INVENTOR.
Harold A. Keller
BY Wells & St. John
ATTYS.

3,540,567

BIASING AND INDEXING APPARATUS FOR SHEET CONVEYOR ASSEMBLY

BACKGROUND OF THE INVENTION

This invention relates to apparatus for indexing and longitudinally aligning sheets on a conveyor and more particularly to means for maintaining said longitudinal alignment as the sheets are moved forward on the conveyor.

The assembly apparatus disclosed in a copending U.S. Pat. application Ser. No. 657,099, now U.S. Pat. No. 3,463,295, forms a continuous veneer strip from a plurality of scarfed veneer sheets in which the sheets are successively indexed onto a conveyor in a longitudinally overlapping manner and then pushed forward by pushing means. It is essential in the formation of a continuous veneer strip that the sheets be maintained in a precise longitudinal alignment until the sheets are securely fastened together, otherwise a defective product is formed. Likewise it is very important that the razor-sharp scarfed ends of the sheets not be damaged in the assembly process.

One of the principal objects of this invention is to provide a biasing means for such a conveyor apparatus to maintain the rear edge of each sheet in firm contact with the pusher means without damaging the rear edge of the sheets.

An additional object of this invention is to provide a biasing means for the apparatus disclosed in the above-mentioned application that is economical to manufacture and simple to install.

These and other objects and advantages of this invention will be apparent upon the reading of the following detailed description of a preferred embodiment.

BRIEF DESCRIPTION OF THE DRAWINGS

A preferred embodiment of this invention is illustrated in the accompanying drawings, in which:

FIG. 1 is a perspective view of an apparatus embodying the principles of this invention showing a sheet being indexed onto a conveyor having a pusher means for engaging the rear edge of the sheet and pushing the sheet forward in an overlapped manner with a preceeding sheet, the front end of the sheet resting on a support means having a biasing means for maintaining the rear edge of the sheet against the pusher means;

FIG. 2 is a perspective view similar to FIG. 1, showing the sheet resting on the conveyor and moving forward with the forward end of the sheet overlapping the trailing end of the preceding sheet;

FIG. 3 is a side elevational view of the apparatus illustrating the position of the pusher means and the support and biasing means in relation to the sheets;

FIG. 4 is a cross-sectional view taken along line 4–4 in FIG. 3 showing details of the biasing means;

FIG. 5 is a cross-sectional view taken along line 5–5 of FIG. 4 showing a friction roller engaging the undersurface of the sheet; and FIG. 6 is a cross-sectional view taken along line 6–6 in FIG. 4 showing a drive means for rotating the friction roller to bias the sheet resting thereon against the pusher means.

DETAILED DESCRIPTION OF THE PREFERRED EMBODIMENT

An indexing and conveying apparatus, generally designated by the arrow 10, is illustrated in FIGS. 1 and 2 for successively moving a plurality of plywood sheets 11 over a conveyor and lowering the sheets in sequence to form a strip of longitudinally overlapping sheets. Each of the veneer sheets 11 have oppositely scarfed ends that enable the sheets to be subsequently glued together to form an integrated strip.

The indexing and conveying apparatus 10 includes an indexing device 12 and a longitudinal conveyor 13. The longitudinal conveyor 13 has a plurality of pusher members 14 evenly spaced along two parallel endless chains 15 and 16 for engaging the rear edges of the scarfed sheets and moving the sheets forward along a selected path. The distance between each of the pusher members is slightly less than the length of the sheets to overlap the scarfed ends of the sheets as they move forward on the longitudinal conveyor 13.

The indexing device 12 has two parallel belt conveyor systems 18 and 19 that move the sheets sideways onto retractable support rods 21 and 22. The support rods 21 and 22 are movable in elongated pneumatic cylinders 23 and 24 respectively.

The indexing device 12 is timed so that the retractable support rods 21 and 22 are retracted to drop the sheets onto the longitudinal conveyor immediately forward of a pusher member 14, as shown in FIG. 2.

The longitudinal conveyor 13 has a frame 26 with parallel side rails 27 and 28 mounted thereon at a forward inclined angle. Immediately inside the side rails 27 and 28 are roller tracks or surfaces 30 and 31 respectively along the upper flight of the endless chains 15 and 16. U-shaped chain tracks 32 and 33 are formed adjacent the roller tracks 30 and 31 respectively for supporting the upper flights of the endless chains 15 and 16 as shown in detail in FIG. 4. A central platform 34 (FIG. 4) is positioned intermediate the chain tracks 32 and 33 for supporting the central portion of the sheet. The parallel endless chains 15 and 16 are mounted between idler sprockets 35 mounted on an idler shaft 37 and drive sprocket 36 mounted on a drive shaft 38.

A transverse stripping plate 40 (FIG. 3) is mounted on the frame 26 at the forward end of the longitudinal conveyor for stripping the rear edge of the sheets from the pusher members 14 as the sheets move forward from the longitudinal conveyor.

A plurality of support members 42 having biasing means thereon are attached at longitudinally equally spaced intervals to the parallel endless chains 15 and 16 to receive and support the forward ends of the sheets. Each of the support members 42 has an elongated transverse frame 43 that extends between the parallel endless chains 15 and 16. The elongated transverse frame 43 includes a front plate 44 (FIG. 4) that extends transversely across the longitudinal conveyor with U-shaped brackets 45 extending downward for attaching to the endless chains 15 and 16 by chain link brackets 46. Side brackets 47 extend rearward from the ends of the front plate 44 for supporting a biasing or friction roller 48 therebetween. The upper profile of the friction roller extends above the front plate 44 to engage the under surface of the sheet.

The friction roller 48 may be considered as an element of the the biasing means for maintaining the rear edge of the sheets against the pusher members 14. Two drive rollers 50 and 51 are mounted to the frame 43 adjacent the ends of the friction roller 48 for engaging the friction roller when the support members 42 are in the upper flight of the endless chains 15 and 16 to rotate the friction roller tending to push the sheet rearward against the pusher members 14, thereby maintaining the rear edge in firm contact with the pusher member. Each of the drive rollers 50 and 51 are pivotally mounted to the frame 43 by a respective arm 52.

When a support member 42 rounds the sprocket 35 and moves into the upper flight of the endless chains 15 and 16, the drive rollers 50 and 51 engage and roll on the roller tracks 30 and 31 respectively and pivot into engagement with the ends of the friction roller 48. As the drive rollers move forward on the roller tracks, rotation is imparted to the friction roller to force the sheet firmly against the pusher member (FIGS. 5 and 6).

As each of the sheets are dropped onto the longitudinal conveyor the front end is supported on the friction roller 48 and the rear edge of the sheet is forced firmly against the pusher member as the sheet is moved forward along the conveyor to maintain longitudinal alignment.

A transverse positioner 55 is mounted alongside the longitudinal conveyor opposite the indexing device 12, to engage the side of each sheet to laterally position the sheet on the longitudinal conveyor.

FIGS. 2 and 3 show a sheet 11a that has been positioned on the longitudinal conveyor and moved forward to an adjacent conveyor means 56. The body of the sheet 11a moves over the stripper plate 40 to flex the rear edge of the sheet 11a upward to strip the rear edge from its respective pusher member. The second sheet 11b is indexed and dropped onto the longitudinal conveyor with the forward end overlapping and engaging the rear scarf end of the preceding sheet 11a. The forward end of the sheet 11b is supported on the support member 42 with the friction roller 48 rotating to bias the sheet firmly against its pusher member 14 to maintain the sheets in longitudinal alignment as they move to the downstream conveying means 56.

It should be understood that the above described embodiment is simply illustrative of the principles of this invention and numerous other modifications may be made without deviating from the scope and principles thereof. Therefore, only the following claims are intended to define this invention.

I claim:

1. In a conveyor apparatus for longitudinally aligning and moving a sheet along a selected path which includes a pusher means for engaging the rear edge of the sheet to push the sheet forward along the path at a selected speed and a support means moving forward at the selected speed of the pusher means for supporting a portion of the sheet, the combination of the improvement of a biasing means moving along the selected path at the selected speed engaging the sheet for maintaining the rear edge of the sheet firmly against the pusher means to prevent longitudinal misalignment while the sheet is being pushed along the selected path.

2. In a conveyor system as defined in claim 1 where the biasing means includes a friction roller that moves forward along the path at the selected speed and a drive means for rotating the friction roller to bias the sheet firmly against the pusher means.

3. In a conveyor system as defined in claim 2 wherein the friction roller is mounted on the support means and supports a portion of the sheet and biases the sheet firmly against the pusher means.

4. In a conveyor system as defined in claim 3 wherein the pusher means and the support means are interconnected by an endless chain driven at the selected speed for moving the sheets forward along the upper flight thereof.

5. In a conveyor as defined in claim 4 wherein roller tracks are positioned adjacent the upper flight and wherein the drive means for rotating the friction roller includes drive rollers attached to the endless chain adjacent to the friction roller for engaging both the roller track and the friction roller along the upper flight of the chain to impart rotation to the friction roller.

6. In an indexing and conveying system for successively indexing a plurality of plywood veneer sheets longitudinally on a conveyor and moving the sheets forward in an overlapping manner with the front end of each sheet overlapping the rear end of the preceding sheet, said conveyor having two spaced parallel endless chains with a plurality of transverse pusher members evenly spaced on the chain for engaging the rear edges of each sheet to push the sheets forward, in combination with the improvement of a plurality of biasing means attached to the chains for movement therewith intermediate the pusher means for engaging the sheets and biasing the sheets firmly against the pusher means as the sheets are moved along the conveyor.

7. In an indexing and conveying system as defined in claim 6 where each of the biasing means includes a frictional roller engaging the underside of the sheet and a drive roller engaging the frictional roller along the upper flight of the chain and means on the conveyor for imparting rotation to the drive roller along the upper flight of the chains to rotate the friction roller to bias the sheets against the respective pusher members to maintain longitudinal alignment.